(12) United States Patent
Ha et al.

(10) Patent No.: US 12,081,973 B2
(45) Date of Patent: Sep. 3, 2024

(54) MOVING VEHICLE CONTROL METHOD AND DEVICE UTILIZING IDENTIFICATION DEVICE

(71) Applicants: Hyundai Motor Company, Seoul (KR); Kia Corporation, Seoul (KR)

(72) Inventors: Jae Jun Ha, Hwaseong-si (KR); Young Jun Moon, Sejong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 385 days.

(21) Appl. No.: 17/438,045

(22) PCT Filed: Nov. 27, 2019

(86) PCT No.: PCT/KR2019/016450
§ 371 (c)(1),
(2) Date: Sep. 10, 2021

(87) PCT Pub. No.: WO2020/189877
PCT Pub. Date: Sep. 24, 2020

(65) Prior Publication Data
US 2022/0141655 A1 May 5, 2022

(30) Foreign Application Priority Data
Mar. 21, 2019 (KR) .................. 10-2019-0032593

(51) Int. Cl.
*H04L 29/06* (2006.01)
*H04W 12/06* (2021.01)

(52) U.S. Cl.
CPC .................. *H04W 12/06* (2013.01)

(58) Field of Classification Search
CPC ...................................................... H04W 12/06
See application file for complete search history.

(56) References Cited

U.S. PATENT DOCUMENTS 6,380,901 B1 * 4/2002 Tessier ..................... H01Q 1/32
343/711
6,703,929 B2 * 3/2004 Baudard ............... B60R 25/245
340/426.36
(Continued)

FOREIGN PATENT DOCUMENTS

CN 201828966 U 5/2011
CN 103430518 A * 12/2013 ....... H04N 21/41407
(Continued)

OTHER PUBLICATIONS

Weiming Hu, Tieniu Tan, Liang Wang and S. Maybank, "A survey on visual surveillance of object motion and behaviors," in IEEE Transactions on Systems, Man, and Cybernetics, Part C (Applications and Reviews), vol. 34, No. 3, pp. 334-352, Aug. 2004, doi: 10.1109/TSMCC.2004.829274. (Year: 2004).*

*Primary Examiner* — Shawnchoy Rahman
(74) *Attorney, Agent, or Firm* — Slater Matsil, LLP

(57) ABSTRACT

An embodiment method for operating a moving object to which an identification device is applied includes recognizing the identification device in response to the moving object being turned on, performing an authentication process with a network through the recognized identification device, and controlling the moving object based on the identification device in response to authentication being completed based on the authentication process.

20 Claims, 8 Drawing Sheets

(56) References Cited

U.S. PATENT DOCUMENTS

| | | | |
|---|---|---|---|
| 8,264,320 B2* | 9/2012 | Nelson | B60R 25/24 |
| | | | 340/5.2 |
| 9,725,069 B2* | 8/2017 | Krishnan | E05B 77/00 |
| 9,769,308 B2* | 9/2017 | Livingston | H04M 1/72463 |
| 9,866,665 B2 | 1/2018 | Badouin | |
| 10,173,642 B2* | 1/2019 | Snider | H04B 1/3816 |
| 11,382,208 B2* | 7/2022 | Sieg | B60R 25/246 |
| 2004/0124968 A1* | 7/2004 | Inada | B60R 25/257 |
| | | | 340/5.72 |
| 2011/0151835 A1* | 6/2011 | Velusamy | H04L 63/0861 |
| | | | 340/5.82 |
| 2014/0240086 A1 | 8/2014 | Van Wiemeersch | |
| 2015/0042454 A1 | 2/2015 | Lee | |
| 2015/0145648 A1 | 5/2015 | Winkelman | |
| 2016/0214572 A1 | 7/2016 | Snider | |
| 2017/0129427 A1 | 5/2017 | Park et al. | |
| 2017/0232931 A1 | 8/2017 | Fernando et al. | |

FOREIGN PATENT DOCUMENTS

| | | | | |
|---|---|---|---|---|
| CN | 103625423 A | | 3/2014 | |
| CN | 104008582 A | | 8/2014 | |
| CN | 104126189 A | * | 10/2014 | ........... G06Q 20/322 |
| CN | 104340168 A | | 2/2015 | |
| CN | 106671913 A | | 5/2017 | |
| CN | 107027096 A | | 8/2017 | |
| CN | 107792009 A | | 3/2018 | |
| JP | 2004130854 A | | 4/2004 | |
| JP | 2005226439 A | | 8/2005 | |
| JP | 2007107377 A | | 4/2007 | |
| JP | 2009287350 A | | 12/2009 | |
| KR | 20040054253 A | | 6/2004 | |
| KR | 20060099044 A | | 9/2006 | |
| KR | 20110019489 A | | 2/2011 | |
| KR | 20120067264 A | | 6/2012 | |
| KR | 101232640 B1 | | 2/2013 | |
| KR | 20150050838 A | | 5/2015 | |

* cited by examiner

MOVING VEHICLE CONTROL METHOD AND DEVICE UTILIZING IDENTIFICATION DEVICE

CROSS-REFERENCE TO RELATED APPLICATIONS

This application is a national stage application of International Application No. PCT/KR2019/016450, filed Nov. 27, 2019, which claims priority to Korean Patent Application No. 10-2019-0032593, filed Mar. 21, 2019, the entire contents of which are incorporated herein for all purposes by this reference.

TECHNICAL FIELD

The present invention relates to a method and apparatus for controlling a moving object by utilizing an identification device.

BACKGROUND

The subscriber identity module (SIM) is used for smart devices and smart phones. In addition, the universal subscriber identity module (USIM) technology may have evolved one step ahead of SIM in the global system for mobile communications (GSM), which is an advanced form of SIM card. Herein, USIM may be a tiny chip that is an essential component inserted in a 3G asynchronous wideband code division multiple access (WCDMA) terminal capable of video calls. Herein, USIM is composed of a micro central processing unit (CPU) and a memory. The CPU identifies a user through an encryption/decryption function, and the memory may be used as a storage space for an additional service and has a various form. Such a SIM card is applicable to a moving object, and this will be described below.

SUMMARY

The present invention may provide a method and apparatus for controlling a moving object by utilizing an identification device.

The present invention may provide a method and apparatus for identifying a user of a moving object based on an identification device and for providing a service to the identified user.

According to an embodiment of the present invention, a moving object operation method may be provided to which an identification device is applied. Herein, the moving object operation method may include: recognizing the identification device, when the moving object is turned on; performing an authentication process with a network through the recognized identification device; and controlling the moving object based on the identification device, when the authentication is completed based on the authentication process.

According to an embodiment of the present invention, a moving object may be provided to which an identification device is applied. Herein, the moving object may include a transceiver configured to transmit and receive a signal and a processor configured to control the transceiver. Herein, the processor may be further configured to recognize the identification device, when the moving object is turned on, to perform an authentication process with a network through the recognized identification device, and to control the moving object based on the identification device, when the authentication is completed based on the authentication process.

Also, according to an embodiment of the present invention, a system may be provided. Herein, the system may include a moving object and an identification device. Herein, the system may be configured to recognize the identification device, when the moving object is turned on, to perform an authentication process with a network through the recognized identification device, and to control the moving object based on the identification device, when the authentication is completed based on the authentication process.

Also, the description below may be commonly applied to an application method of an identification device, a moving object and a system.

According to an embodiment of the present invention, a user of a moving object may be detected after authentication is completed. Herein, when the detected user of the moving object corresponds to a user ID that is authenticated based on an identification device, the moving object may be controlled.

Herein, according to an embodiment of the present invention, the user may be detected based on at least any one of an authentication key, image recognition, fingerprint recognition, iris recognition, face recognition, and voice recognition.

Also, according to an embodiment of the present invention, when a moving object senses an emergency situation, the moving object may be controlled irrespective of the authentication of an identification device.

Also, according to an embodiment of the present invention, an identification device may include moving object setting information corresponding to a user ID, and when authentication is completed based on the identification device, a setting for the moving object may be changed based on the moving object setting information.

Also, according to an embodiment of the present invention, setting information for a moving object may include any one or more among a position of a driver's seat, a height of the driver's seat, a color of interior lighting, brightness of the interior lighting, a position of a room mirror, an angle of the room mirror, a position of a side-view mirror, an angle of the side-view mirror, an inside temperature, a steering wheel angle, a tire pressure, an autonomous driving setting parameter, a transmission setting mode, a dashboard mode, a navigation setting, a content setting, and a wireless communication linkage mode.

Also, according to an embodiment of the present invention, a moving object may recognize an identification device, while the identification device is being installed.

Also, according to an embodiment of the present invention, when a moving object recognizes an identification device for the first time, an additional authentication process may be performed for the identification device.

Also, according to an embodiment of the present invention, when a moving object recognizes an identification device for the first time, the moving object may verify at least one of an ID and authority information of the identification device and perform an additional authentication process based on the verified information.

Also, according to an embodiment of the present invention, when a moving object recognizes an identification device for the first time, the moving object may further exchange authentication information on the identification device with another device, which has been completely authenticated, and perform an additional authentication process based on the exchanged authentication information.

Also, according to an embodiment of the present invention, when an additional authentication process for an identification device is completed, a moving object may store history information on the identification device.

Also, according to an embodiment of the present invention, when a moving object recognizes an identification device corresponding to history information again, the moving object may perform an authentication process via a network without an additional authentication process.

Also, according to an embodiment of the present invention, an identification device may be installed in a mirror of a moving object.

Also, according to an embodiment of the present invention, an identification device may be recognized, irrespective of whether or not a moving object is turned on, and perform an authentication process.

Herein, according to an embodiment of the present invention, when the identification device is recognized, while the moving object is turned off, and performs the authentication process, the identification device may operate by receiving power from the moving object.

In addition, according to an embodiment of the present invention, when the identification device is recognized, while the moving object is turned off, and performs the authentication process, the identification device may operate by being powered by itself.

According to the present invention, a moving object may be controlled by utilizing an identification device.

According to the present invention, a moving object user may be identified based on an identification device, and a service may be provided.

The technical objects of the present invention are not limited to the above-mentioned technical objects, and other technical objects that are not mentioned will be clearly understood by those skilled in the art through the following descriptions.

DETAILED DESCRIPTION

Figure 1:
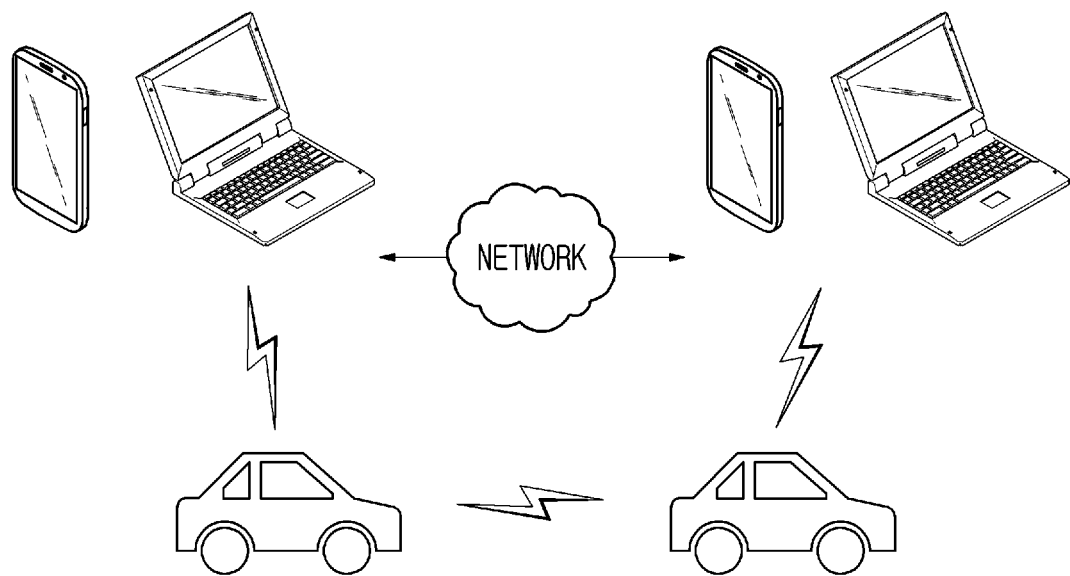
FIG. 1 is a view illustrating a method in which a moving object performs communication with other devices.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Advantages and features of the present disclosure, and methods for achieving them will be apparent with reference to the embodiments described below in detail with reference to the accompanying drawings. However, the present invention is not limited to the embodiments set forth herein but may be embodied in many different forms. The present embodiments are provided to make disclosed contents of the present invention thorough and complete and to completely convey the scope of the invention to those with ordinary skill in the art.

FIG. 1 is a view illustrating a method where a moving object communicates with another moving object or device via a network. Referring to FIG. 1, a moving object may communicate with another moving object or another device. Herein, as an example, the moving object may communicate with another moving object or another device based on cellular communication, WAVE communication, dedicated short range communication (DSRC), or other communication schemes. That is, as a cellular communication network, a communication network such as LTE, 5G, Wi-Fi communication network, WAVE communication network, etc. may be used. In addition, a local area network used in a moving object, such as DSRC may be used, and the present disclosure is not limited to the above-described embodiment.

In addition, as an example, for the purpose of security of a moving object with respect to communication of the moving object, a module capable of communicating only with a device inside the moving object and a module capable of communicating with a device outside the moving object may exist separately. As an example, inside the moving object, communication based on the security such as Wi-Fi communication may be performed only for a device within a certain range in the moving object. As an example, the moving object and a personal device owned by the moving object driver may include a communication module for performing communication only with each other. That is, the moving object and the personal device of the moving object driver may use a communication network disconnected from an external communication network. Also, as an example, the moving object may include a communication module for performing communication with an external device. In addition, as an example, the above-described module may be implemented as a single module. In other words, based on a single module, a moving object may communicate with another device, which is not limited to the above-described embodiment. That is, in a moving object, communication may be embodied based on various methods and is not limited to the above-described embodiment.

Herein, as an example, a moving object may refer to a device capable of moving. As an example, a moving object may be a vehicle (including an autonomous vehicle or an automated vehicle), a drone, a mobility, a pallet, a mobile office, a mobile hotel or a personal air vehicle (PAV). In addition, a moving object may be any other moving apparatus and is not limited to the above-described embodiment.

FIGS. 2A-2D are views illustrating a method of applying an identification device to a moving object.

As an example, the identification device may be a device having at least any one or more functions of identifying a user, a control target, and a service target. In addition, as an example, the identification device may be a device having an ID function. In addition, as an example, the identification device may be at least any one or more among a smart device, a smart module, a user identification module, and an identification module. That is, the identification device may be a hardware configuration. In addition, as an example, the identification device may be a software configuration used for the above-described identification. Herein, as an example, the identification device may be a subscriber identity module (SIM). As an example, a SIM, which is applied as an identification device to a moving object, may be at least one of a mobility SIM (M-SIM) and a vehicle SIM (V-SIM). In addition, as an example, the identification device may be a module that is the same as or compatible with an existing SIM, which is not limited to the above-described embodiment. Although the description below focuses on an identification device, the identification device may be replaced by a smart module, a user module, a SIM and the like, which is not limited to the above-described embodiment. However, for the convenience of explanation, the description below focuses on an identification device. As described above, an identification device may be applied by considering such a case where a moving object performs communication with an external device. As an example, a smart phone user may be recognized through a universal subscriber identity module (USIM) in the smart phone, and a service may be provided. As an example, when a device is compatible with a same brand or an identification device, a user of the device may be distinguished by changing only the user's identification device and a service may be provided based thereon. Based on what is described above, a moving object may also have an integral identification device card. As an example, as an identification device applied to a moving object, a vehicle SIM may be referred to as VSIM. That is, as an identification device applied to a moving object, a new type of identification device may be applied. As an example, a VSIM may be compatible with a USIM or another SIM. In addition, a VSIM may provide another service by considering a characteristic of a moving object, which is not limited to the above-described embodiment. In addition, an identification device card applied to a moving object may be provided and be referred to by another name, which is not limited to the above-described embodiment.

Figure 2A:
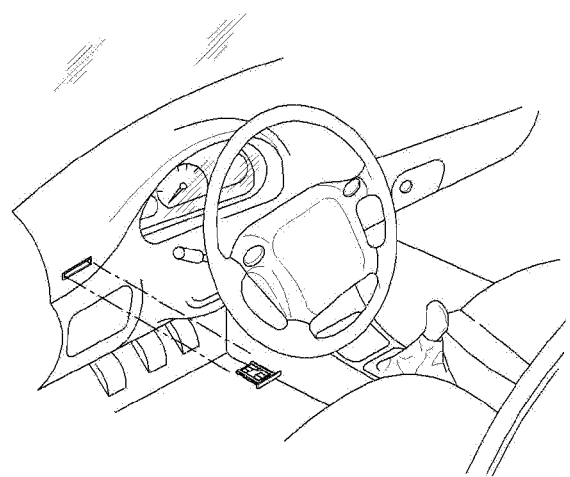
FIGS. 2A-2D are views illustrating a method of applying an identification device to a moving object.
Figure 2B:
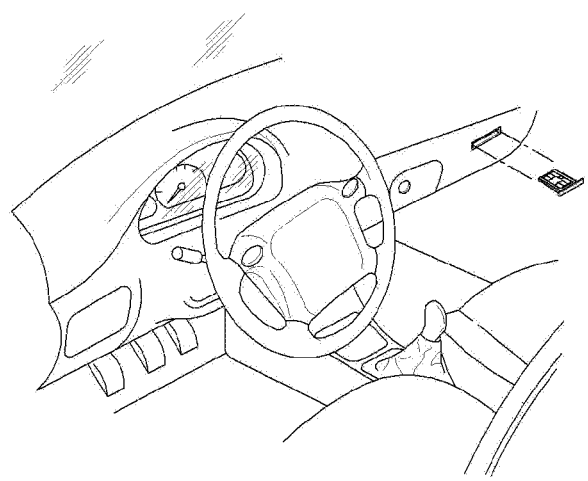

Meanwhile, as an example, referring to FIGS. 2A-2D, there may be a part in a moving object, to which an identification device is applicable. Herein, FIG. 2 is merely an example to which an identification device is applied, and the present invention is not limited to the above-described embodiment. Specifically, as shown in FIG. 2A, a part for applying an identification device may exist in a position visually identifiable at the driver's seat of a moving object. As another example, as shown in FIG. 2B, an identification device may be applied inside the glove compartment of a passenger seat in a moving object. As another example, an identification device may be inserted into a part where a display of a moving object is present, which is not limited to the above-described embodiment.

Figure 2C:
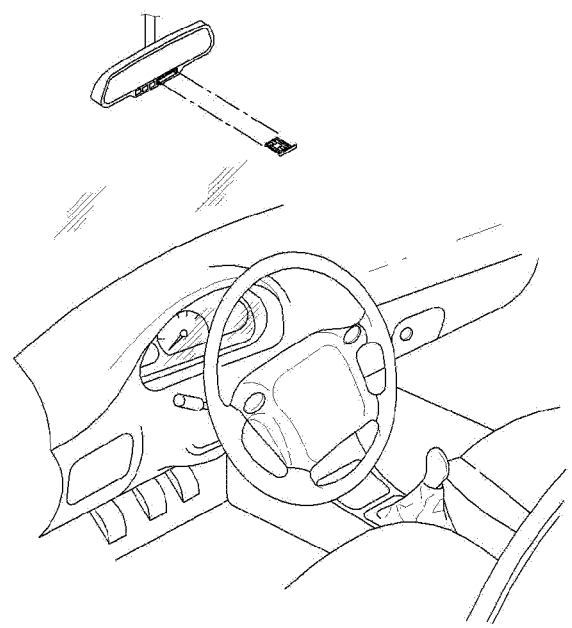
Figure 2D:
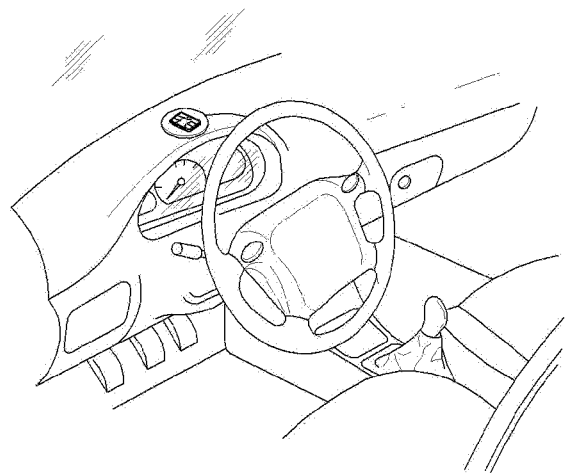

As another example, as shown in FIG. 2C, an identification device may be installed in a mirror in a moving object. For example, as a mirror in a moving object is very accessible to a passenger without affecting the operation or other apparatuses of the moving object, an identification device may be installed in the mirror in the moving object. As another example, as shown in FIG. 2D, an identification device may be installed in a cradle or a pad. For example, when a moving object is controlled by an identification device, the identification device may be frequently replaced according to users. In view of what is described above, an identification device may be installed in a cradle or a pad to enhance the convenience of installation and may be used to control a moving object based thereon. Meanwhile, as an example, a cradle or a pad may allow an identification device to be installed based on magnetism. In addition, as an example, an identification device may be installed in a cradle or a pad based on another method, which is not limited to the above-described embodiment.

As another example, considering the portability of an identification device, the identification device may be embodied in a combined state with a tool key or a car key. That is, an identification device may be installed in a tool key or a car key, and the identification device may be removed from the car key and be used by being installed in a moving object. As an example, a USIM or another identification device with a similar form may have a small size. In addition, an identification device has a part contacting a moving object, and it is necessary to prevent the contact part from being damaged. In consideration of the above description, an identification device may be combined with a car key or a tool key. As another example, a car key or a tool key itself may be an identification device. That is, each user may possess his own car key or tool key as an identification device, based on which a moving object may be controlled. Meanwhile, as an example, when a car key or a tool key is an identification device, it is possible to consider a case in which the identification device is installed in a moving object as in FIGS. 2A-2D described above. In addition, as an example, a car key or a tool key may communicate with a moving object via a local area network (e.g., Bluetooth, Beacon, NFC) and thus perform message exchange and identification. That is, a car key or a tool key reflecting the uniqueness of an individual may be used as an identification device, which is not limited to the above-described embodiment.

As another example, the identification device may be installed through an existing device, which is installed in a moving object. For example, an existing device (e.g., Hi-Pass terminal, black box) may be installed in a moving object. Herein, in case a separate installation part is made in a moving object in order to install an identification device, as the equipment for the moving object should be modified and a configuration or components for additional installation may be required, the existing device may be used to install the identification device. That is, a configuration for installing the identification device may be added to the existing device that is already installed, based on which the identification device may be installed. As another example, an identification device may be recognized through an existing terminal (e.g., USB port, cigar jack socket) included in a moving object.

As another example, an identification device may be applied to any position in a moving object within a range capable of authentication, and the identification device may be applied either as an integrated form or a separate form to a control unit, a communication unit or constitutional parts of the moving object.

Specifically, a moving object may include a separate installation unit for installing an identification device or a part in which the identification device is installed. That is, an identification device may be installed in a moving object as an independent part that is separate from other parts. As another example, as described above, an identification device may be installed in a moving object as a form including at least one of a control unit, a communication unit and another unit. As an example, in a moving object, a control unit or a communication unit may be a unit for communicating with an external device or for controlling information. Herein, an identification device may provide necessary information to the control unit or the communication unit or operate through identification and authentication. That is, as the identification device may be a device closely associated with the control unit or the communication unit, the identification device may be installed in a moving object by being combined with the units. That is, the identification device may be installed in the moving object as an integrated form with other units. As another example, an identification device may be embodied as an identification device embedded in a moving object. An embedded identification device may be embodied physically inside a moving object or be embodied as software in the operation and design processes of the moving object, which is not limited to the above-described embodiment. This will be described below.

As an example, when equipment of a moving object is modified or an additional configuration is installed to install an identification device, a large expense may be required. In consideration of what is described above, an identification device may be installed (or recognized) through an existing terminal included in a moving object. Thus, an identification device may be easily applied to an existing moving object, which is not limited to the above-described embodiment.

Herein, when an identification device is applied to a moving object, the moving object may identify a subscriber based on the identification device. That is, similar to a smart phone, the moving object may also identify a moving object user based on the identification device. Herein, the identification device may include environment information according to the user like driving record information of the user, navigation setting information, moving object setting information, driver seat information and steering information. Herein, when the moving object recognizes the identification device, the moving object may change the setting of the moving object based on information included in the identification device. In addition, as an example, charging for the use of a moving object may be performed by an identification device. As an example, a moving object may also perform communication as described above, and charging may be performed based on communication. In addition, as an example, charging may be performed based on a shared moving object or other moving objects. Herein, based on usage time, driving distance and the like, usage details of a moving object may be confirmed through an identification device, based on which charging may be performed. That is, by applying an identification device to a moving object, a system may be set up based on information on usage of the moving object. In addition, as an example, when an identification device is not applied to a moving object, the moving object may not operate. As an example, a moving object to which an identification device is applied may operate only when recognizing the identification device. However, as an example, driving may be possible in some cases where an emergency or an urgent situation is considered.

Meanwhile, as an example, as described above, when an identification device in a moving object is not identified and authenticated, the control authority for the moving object may not be approved. As an example, in case a moving object is a vehicle, when the vehicle is turned on, the vehicle may be directly controlled, which is the traditional way. However, when an identification device is applied, the vehicle may be controlled only after the vehicle is turned and the identification and authentication for the identification device are completed. Specifically, a moving object may operate based on complete autonomous driving. In addition, as an example, a moving object may perform communication with other apparatuses via a communication network and operate based on information received through the communication. However, in the case of a moving object, as a multiplicity of operations and functions aimed for moving may be defined, a security problem and a risk of accident may exist when identification and authentication are not ensured. In consideration of what is described above, a moving object may be turned on in a way different from the traditional way and be controlled when identification and authentication are performed based on an identification device.

As another example, an identification device may operate irrespective of whether a moving object is turned on or not. As an example, apparatuses for supplying power to a black box and other existing apparatuses may be included in a moving object. Herein, an identification device may operate by receiving power from the moving object. As another example, an identification device may be an apparatus that is powered by itself and operates. In addition, as an example, an identification device may be an apparatus that supplies power and operates based on a separate charger like a wireless charger or a solar charger. Herein, as the operation of the identification device may not be an operation consuming large power, the identification device may operate irrespective of whether a moving object is turned on or not. An identification device may be configured to operate not only by receiving power from a moving object but also by being powered by itself. That is, an identification device may be a device capable of operating irrespective of whether a moving object is turned on or not, which is not limited to the above-described embodiment. Herein, as an example, even when the moving object is not turned on, the identification device may perform the above-described identification and authentication. Meanwhile, as an example, in order to make an identification device triggered when a moving object is not turned on, identification and authentication may be performed when a personal device of the owner of the moving object is recognized. As another example, even when a moving object is not turned on, if it is recognized that a driver or another user is in the moving object, the operation of identification and authentication for an identification device may be performed, which is not limited to the above-described embodiment. That is, even when the moving object is not turned on, the identification device may operate, which is not limited to the above-described embodiment.

Herein, as an example, in consideration of what is described above, random removal of an identification device may be prevented in a moving object. Specifically, in the case of a moving object, as described above, there may be a high risk of security and accident. In addition, as described above, in the case of operation based on an identification device, when the identification device is removed at random, there may be a risk of accident based on authentication error. In consideration of the above description, random removal of an identification device may be prevented. As an example, an identification device may be installed and removed at random before a moving object is turned on. That is, when the moving object does not operate, the removal of the identification device may not be locked. Accordingly, a user who wants to use the moving object may change the identification device before the moving object is turned on and may use another identification device suitable for the user.

Herein, as an example, when the moving object is turned on, the random removal of the identification device may be prohibited. That is, locking for the removal of the identification device may be performed. Based on what is described above, it is possible to prevent an accident caused by the removal of an identification device while a moving object is running. Herein, as an example, even when the moving object is turned on, locking for the removal may be different according to whether the moving object is running or not. As an example, when the moving object is turned on but is not running, the removal of the identification device may be possible after authentication for a separate device. As an example, the separate device may be a smart device. In this case, a user may perform authentication for the identification device through the smart device and obtain authority for the removal of the identification device by providing relevant information to the moving object. Then, the removal of the identification device is unlocked, and when the identification device is removed from the moving object, the moving object may be turned off. Next, when another identification device is installed, the moving object may operate based on the other identification device. On the other hand, when the moving object is turned on and is running, even if authentication is performed for another device, the removal of the identification device may be impossible. As an example, when the moving object is running, the moving object may execute autonomous driving or may run by exchanging information with an external device. As an accident may occur due to the arbitrary removal of the identification device, the arbitrary removal may be prevented to prevent the accident.

Figure 3:
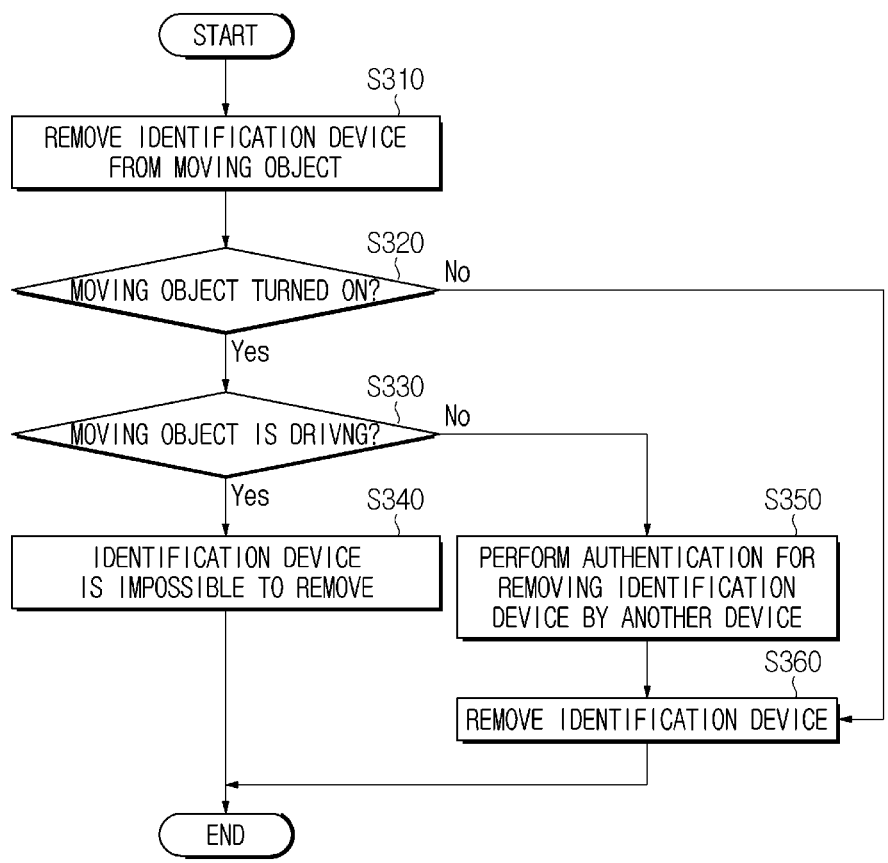
FIG. 3 is a view illustrating a method of removing an identification device from a moving object.

For a concrete example, referring to FIG. 3, the removal of an identification device may be performed in a moving object (S310). Herein, as an example, the identification device may be removed by a user or the removal may be executed based on a triggering operation received by the moving object. Herein, the triggering operation may be pushing a button or receiving a signal for removal from an external device, which is not limited to the above-described embodiment.

Herein, when the identification device is removed from the moving object, it is possible to check whether the moving object is turned on or not (S320). When the moving object is turned on, it is possible to check whether the moving object is running or not (S330). Herein, when the moving object is turned on and is running, as described above, it may be impossible to remove the identification device from the moving object under the consideration of security and accident risk (S340). On the other hand, when the moving object is not running, separate authentication for removing the identification device may be performed based on another device (S350). As an example, as described above, the other device may be a smart device. That is, when the moving object is not running and separate authentication through the other device is possible, the identification device may be removed from the moving object (S360). Herein, as an example, when the identification device is removed from the moving object, the moving object may be switched to the turn-off state. On the other hand, in the case above, when the moving object is turned off, the identification device may be removed, which is the same as described above (S360).

As another example, in the case of an existing smart device (e.g., a smart phone), a device user and an identification device (e.g., a USIM) may be generally in one-to-one correspondence with each other. For example, no change for the identification device may be necessary except for such a reason as the user's overseas trip or the damage of a smart phone. However, as an example, in the case of a moving object, it may be normally used by multiple users. As an example, in the case of a vehicle, it is possible to consider a case where not only a vehicle owner but also a family member or an acquaintance may drive the vehicle. In consideration of the above description, a multiplicity of users may be registered or authenticated for one identification device. As an example, a multiplicity of users (e.g., a vehicle owner and the vehicle owner's family) may be registered in one identification device. Herein, as an example, each user may use a different service and information corresponding thereto. In consideration of the above description, a multiplicity of users may be registered in an identification device. However, in the case described above, even when a moving object is turned on and the identification device is identified and authenticated, additional authentication may be performed to identify a user. As an example, the authentication for an additional user may be performed based on the moving object and a user-owned device. As an example, the user-owned device may receive a signal for authentication when the moving object is turned on and the identification and authentication for the identification device are completed. As an example, the signal may be transmitted based on a local area communication module between the moving object and the user device. Thus, the signal may be transmitted to a user inside the moving object. Herein, the user may perform additional authentication in a corresponding device and may control the moving object as a specific user is recognized among multiple users registered to the identification device.

Meanwhile, as another example, when a moving object is used, the above-described additional authentication of a user-owned device may be performed by another method. For example, when the moving object is turned on and identification and authentication for an identification device are completed, the moving object may obtain additional authentication information. For example, the moving object may include a camera, recognize a user at the driver's seat of the moving object, and identify a specific user among users registered to the identification device based on the recognition. For another example, there may be fingerprint recognition or a separate authentication key. That is, when the moving object is turned on and identification and authentication for an identification device are completed, each user may be identified through a fingerprint or after receiving a separate authentication key (e.g., a password). In addition, as an example, separate authentication may be by at least any one or more among fingerprint recognition, iris recognition, face recognition, moving object head unit input, FOB key, electronic key, Internet advance reservation, another device, a server or a mobile device. That is, separate authentication may be required, and a method for separate authentication is not limited to the above-described embodiment. Herein, as an example, the separate authentication may be performed based on an intrinsic characteristic for a user. As another example, authentication may be performed based on recognition information on a user's image, voice and the like, which is not limited to the above-described embodiment. For a concrete example, in the case of a smart device, a user of the smart device may carry the device all the time. However, in the case of a moving object, the moving object may be used periodically or based on an event. Herein, as an example, in consideration of the above-described charging and setting information on the use of the moving object, there may be a limitation in completing identification and authentication by using only an identification device. Accordingly, as described above, when an identification device completes identification and authentication and then additional authentication is completed based on the above-described method of detecting a user, a moving object may operate or be controlled. As another example, when an identification device is used by a single user, no additional authentication as described above may be required. That is, in the case of a single user, additional authentication may not be required, and a moving object may be completed immediately after identification and authentication are completed for an identification device.

As another example, as described above, a moving object may be controlled only when identification and authentication are completed through an identification device. In addition, as an example, a moving object may be controlled only when additional authentication for a user is performed, which is not limited to the above-described embodiment. However, as an example, as described above, when operation is based on identification and authentication, which are performed by an identification device, an emergency situation may be difficult to handle. In consideration of what is described above, when a moving object detects or recognizes an emergency situation, a user may control the moving object irrespective of an identification device. However, as an example, in an emergency situation, as described above, a setting based on an identification device may not be applied. That is, the control authority of a moving object may be permitted by considering a specific situation, but the moving object may be controlled only by an identification device in the other situations except the emergency situation. Based on the above description, when a moving object has a multiplicity of users, an operation for an identification device may be possible. As an example, based on the above description, a SIM card for a moving object may be applied to the moving object. Herein, in order to use the moving object, information on a multiplicity of users may be registered to the SIM card, and the moving object may operate through identification of an individual user after identification and authentication are performed based on an identification device, which is not limited to the above-described embodiment.

Meanwhile, as another example, an additional process may be required when initial authentication is performed between an identification device and a moving object.

Specifically, as described above, an identification device may be recognized after a moving object is turned on so that the moving object may be controlled based on the identification device. However, when an identification device is installed in a moving object for the first time, an additional process may be implemented based on whether or not the identification device has authority to control the moving object and whether or not initial setting is possible. As an example, when an identification device is installed for the first time while a moving object is turned on, the moving object may determine whether or not the identification device is installed for the first time. Herein, when the identification device is an identification device that is already installed, the moving object may perform setting for recognizing the identification device based on history information on the identification device and perform an authentication process based on the setting. That is, the moving object may quickly perform authentication for the identification device based on history information on the identification device.

On the other hand, when an identification device is installed in a moving object for the first time, the moving object may determine whether or not the identification device has authority to control the moving object. Herein, as an example, the moving object may check information on a unique ID included in the identification device and thus may determine whether or not the identification device has authority. As another example, the moving object may be linked to the identification device and provide additional authentication information through a device (e.g., a smart phone) of which the authentication is completed. Herein, from the device which is completely authenticated, the moving object may confirm that the identification device has authority, and may perform initial authentication based on it. Meanwhile, when the moving object succeeds initial authentication based on the above description, the moving object may update information on the identification device. Herein, when the moving object recognizes the identification device again, the moving object may quickly perform authentication by implementing an authentication process for the identification device without an additional process described above. That is, when the identification device is installed in the moving object for the first time, an additional process for confirming authority and setting may be required, based on which the moving object may register the identification device and let the identification device operate.

As another example, even when a moving object is not turned on, identification and authentication for an identification device may be performed. An identification device may operate while a moving object is not turned on, as described above. Herein, as an example, when the moving object is not turned on, the identification device may perform a process of identification and authentication. As an example, when the identification device is located inside the moving object, the moving object may recognize the identification device and perform an identification and authentication process with the recognized identification device. Herein, as an example, the moving object may transmit a signal for authenticating periodically the identification device to the interior of the moving object or transmit a signal for identification and authentication when sensing that the identification device is detected, which is not limited to the above-described embodiment. Herein, as an example, the moving object may identify the presence of the identification device irrespective of whether or not the moving object is turned on and thus may perform the above-described process of identification and authentication, which is not limited to the above-described embodiment.

Figure 4:
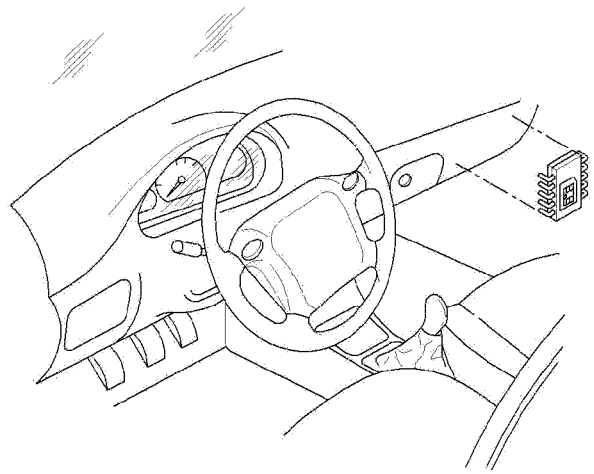
FIG. 4 is a view illustrating a method of applying an embedded identification device to a moving object.

In addition, as an example, referring to FIG. 4, an embedded identification device (or, an embedded SIM (ESIM)) may be applied to a moving object as an identification device. Herein, ESIM may mean a digital SIM, not a physical card, which is installed inside the moving object. As an example, the ESIM may be a SIM that encodes authentication information included in the SIM and is installed inside the moving object. Herein, as an example, information included in the ESIM of the moving object may be modified based on remote or other communication. That is, in the case of a moving object, there may be an owner, and it may be necessary to implement authentication information based on the owner. In this case, as the owner of the moving object may be information that does not change easily, user identification information may be implemented through the ESIM, and the moving object may operate through authentication. Herein, as an example, when the ESIM is applied to the moving object, authentication may be performed based on an authentication system in the moving object (or mobility). As another example, authentication for an ESIM embedded in a moving object may be performed based on a mobile device. As an example, a mobile device may be a smart device, a head unit, and the like. That is, authentication for an ESIM embedded in a moving object may be performed based on a separate mobile device.

As another example, an ESIM embedded in a moving object may be authenticated based on communication with a server. As an example, a smart device may recognize a SIM through communication with a base station. Based on a similar method, an ESIM of a moving object may be authenticated based on communication between the ESIM and a server and operate based on the authentication.

As another example, an ESIM embedded in a moving object may be authenticated based on a D2D method or an M2M method. As an example, an owner or driver of a moving object may have a mobile device when the owner or driver wants to drive the moving object. In addition, as an example, a mobile device of a moving object may be used. Herein, authentication for an ESIM embedded in a moving object may be performed based on a mobile device located on a nearby street and a D2D method. As an example, the above-described authentication method may be implemented by considering the security of a moving object.

As another example, regarding FIGS. 2A-2D and FIG. 4 described above, as the ESIM does not physically exist as in the case of FIG. 4, the ESIM may not be removed or detached. However, in the case of a general identification device, the general identification device may be removed from a moving object in consideration of theft of the moving object or other situations. Herein, as an example, a system for preventing the theft of a moving object and forced removal may be required. As an example, when an identification device is applied to a moving object, if the identification device needs to be removed, additional authentication through another mobile device may be required. That is, the identification device may be removed after authentication and identification based on another device that is mutually authenticated with the identification device of the moving object. As another example, the removal of an identification device may be performed through personal authentication. As an example, authentication may be performed based on an intrinsic characteristic of a user like fingerprint recognition, iris recognition or face recognition, and removal may be possible only by an authenticated user. In addition, as an example, removal of an identification device may be performed only when necessary information is authenticated based on artificial intelligence (AI). As an example, removal may be possible only by a user who has been authenticated based on recognition information on the user's image, voice and the like. That is, as in FIG. 3 described above, removal may be possible according to whether or not a moving object is turned on or whether or not the moving object is driven, and removal may be possible based on authentication for security reasons or in order to prevent an accident, irrespective of whether or not a moving object is turned on or whether or not the moving object is driven. However, the present invention is not limited to the above-described embodiment.

In addition, as an example, an identification device may communicate with neighboring IoT devices and be given a service based on the communication. As an example, identification devices may also be applied to IoT devices. As a more concrete example, as of now, an identification device may be applied only to a smart phone, but a multiplicity of identification devices, which are compatible with each other and identify a same user, may be applied to a multiplicity of devices like a smart phone, a moving object, and a home appliance. That is, a user may provide a service to multiple devices through an identification device for the same user.

In addition, as an example, when a moving object is equipped with an identification device, the moving object may operate by being combined with an ITS infrastructure. As an example, when performing autonomous driving, an identification device in the moving object may be recognized, and an autonomous driving service may be provided from a nearby ITS infrastructure through the recognized identification device. Herein, authentication for a user may be performed through the identification device, and the service may be provided based on user information thus authenticated.

In addition, as an example, a service/security may be provided through an identification device. In addition, a sharing service like a moving object sharing service may be provided by an identification device.

In addition, as an example, control of an ITS infrastructure or a traffic system may be performed through an identification device of a moving object. As an example, communication with a server or RSU may be performed through an identification device of a moving object, based on which control may be performed.

As another example, a traffic infrastructure may be directly controlled based on edge computing in a moving object. As an example, user authentication may be performed through an identification device of a moving object, and IoT or ITS infrastructures may be controlled. As an example, based on an authenticated user, a street lamp may operate in a nearby area of a moving object that is running. That is, as direct control is performed, instead of central control, through authentication between an identification device of a moving object and a neighboring infrastructure, delay may be prevented and the operating efficiency may be improved.

In addition, as an example, as described above, an identification device may include information on a user. Herein, when authentication is performed through an identification device of a moving object, control of the moving object may be changed based on user information included in the identification device, which is the same as described above. As an example, when a moving object completes authentication through an identification device, moving object setting information like seat, display, moving object control, and navigation service may be automatically set based on the identification device. That is, an identification device may perform not only authentication but also a control device function for enhancing the convenience of using the moving object.

In addition, as an example, as described above, an identification device may be applied in a moving object sharing system. As an example, a shared moving object may be periodically used by a multiplicity of users. In view of what is described above, control of a shared moving object for each user may be inefficient for operation. Accordingly, a moving object user may be identified through an identification device, based on which a moving object may be controlled. That is, a renter of a shared moving object may install his identification device in the moving object, and when the moving object recognizes the identification device, the renter may use the shared moving object. Meanwhile, as an example, in the case of a sharing service, as described above, personal settings like the seat, display and steering of a moving object may be changed based on user information included in an identification device, which is the same as described above. In addition, in the case of a sharing service, charging for the use of a moving object may be performed through an identification device. That is, as the use of a moving object may not be clearly distinguished according to users, charging for each person may be possible through an identification device. As another example, it is possible to consider a case in which a personal moving object is shared with another user. Herein, as an example, in the case described above, the renter may control the moving object through the lender's identification device. Herein, the lender may provide control authority for the identification device to the renter, and the renter may control the moving object through the lender's identification device based on the permitted control authority. As an example, control authority may be a password or authentication for a renter's device. As another example, there may be both a lender's identification device and a renter's identification device, and a moving object may recognize a multiplicity of identification devices.

As a more concrete example, an identification device of a lender lending a moving object and an identification device of a renter renting the moving object may be used in a moving object sharing system. As an example, a lender lending a moving object may usually be the owner of the moving object. That is, an identification device for the owner of a moving object may be applied to the moving object. Herein, the moving object may be controlled based on the identification device of the owner of the moving object, when the moving object is normally used or driven. Meanwhile, as an example, when a moving object is used by a sharing system, as described above, the moving object may be configured to recognize a renter identification device and be controlled. Herein, as an example, the renter identification device may be an identification device exclusively dedicated to sharing for the purpose of sharing a moving object, and the moving object may be controlled through the renter identification device. That is, in a moving object sharing system, a renter may install a renter identification device in a moving object or make the renter identification device recognized and based on this, may use the moving object. As described above, since an identification device for a moving object owner (or lender) and an identification device for a renter exist separately, it is possible to distinguish a case in which a moving object is provided by a sharing service and a case in which the moving object is normally used.

In addition, as a concrete example, in consideration of being a moving object owner, a lender identification device may be an embedded identification device (e.g., ESIM) that is embodied either as software or as hardware. Herein, a renter identification device may be an identification device capable of being separately installed. Herein, the lender identification device may be identified and authenticated through a password. In addition, as an example, the lender identification device may be identified and authenticated through additional information in order to enhance security, which is not limited to the above-described embodiment. Meanwhile, a renter identification device may be used by being installed in a moving object and being recognized. That is, when a moving object is normally used the moving object may operate by recognizing a lender identification device based on a password. When the moving object is shared, the moving object may operate by recognizing an installed renter identification device so that a sharing service may be provided. Thus, the two cases may be distinguished, but the present invention is not limited to the above-described embodiment.

As another example, when an identification device is applied to a moving object, authentication may be performed based on a server in consideration of the security of the moving object. As an example, a server may include a security certificate and information necessary for security. Only when security is authenticated through an identification device of a moving object and the security of a server, authentication for the moving object is completed and the moving object may be used.

As another example, when an identification device is applied to a moving object, authentication may be performed without a server by considering the security of the moving object. As an example, a moving object may perform communication with a neighboring moving object or other devices based on V2X or V2V communication. Herein, each moving object or device may include each hash value based on a blockchain, and based on this, mutual security may be authenticated via a network structure. That is, the security of a moving object may be ensured through a blockchain.

Figure 5A:
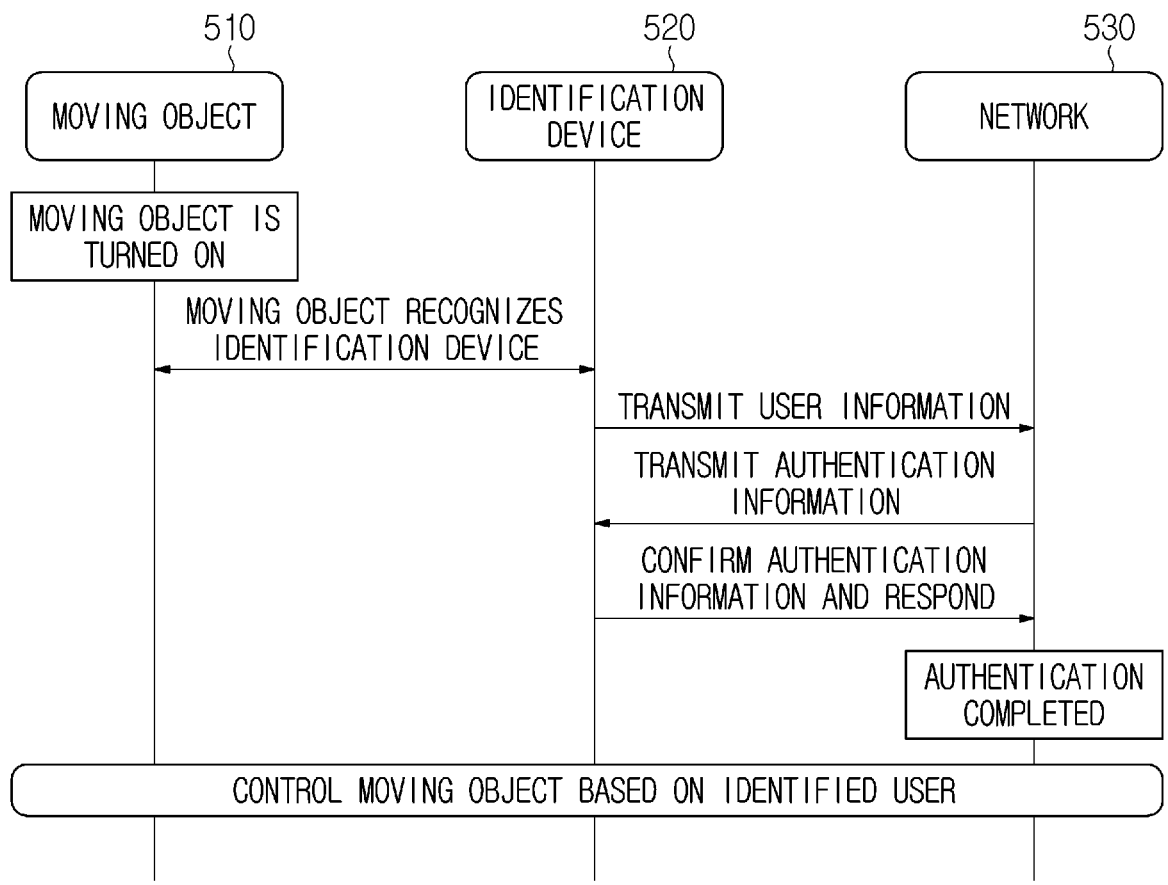
FIGS. 5A and 5B are views illustrating a method in which a moving object performs authentication based on an identification device.
Figure 5B:
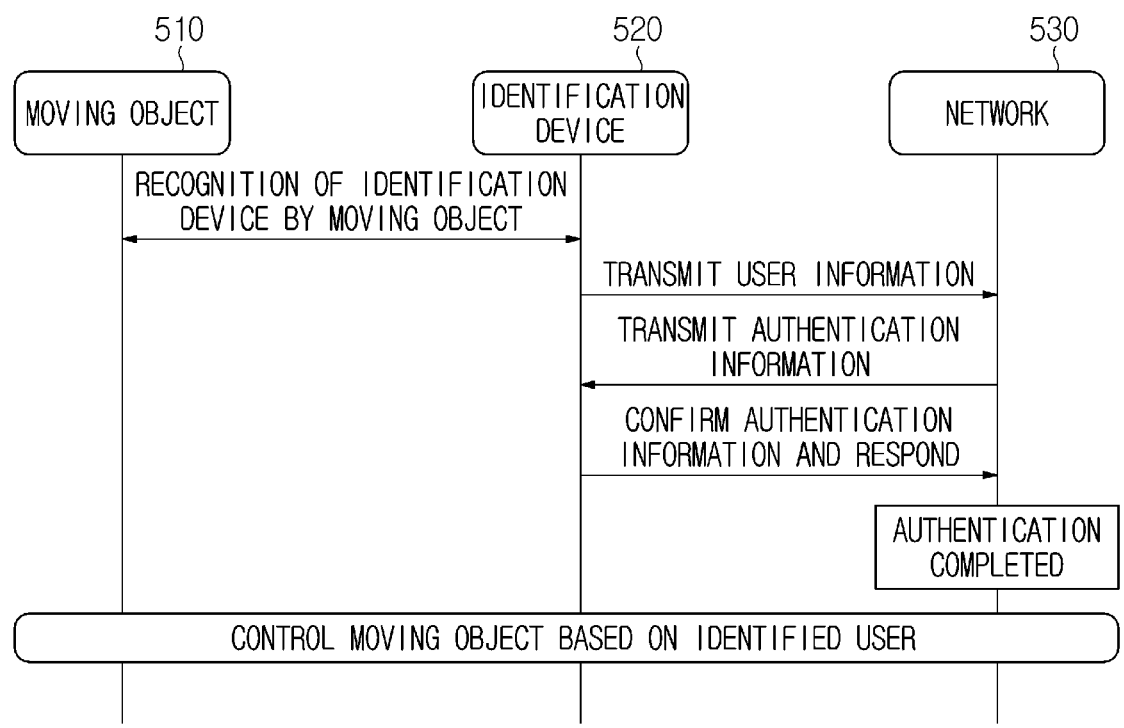

In addition, FIGS. 5A and 5B are views illustrating a method in which a moving object operates based on an identification device. Referring to FIG. 5A, a moving object 510 may be turned on. Herein, the case in which the moving object is turned on may be considered as a case in which the moving object starts up. Herein, as an example, the moving object 510 may recognize an identification device 520. Specifically, as described above, the identification device may be installed in/removed from the moving object 510 or be integrated as an embedded type. Herein, when the moving object 510 is turned on, the moving object 510 may detect the installation state of the identification device 520, and based on this, mutual recognition may be performed. Herein, when the mutual recognition between the moving object 510 and the identification device 520 is completed, the identification device 520 may transmit user information to a network 530.

As another example, referring to FIG. B, the moving object 510 may recognize the identification device 520 irrespective of whether the moving object 510 is turned on or not. That is, the moving object 510 may recognize the identification device 520, even when the moving object 510 is turned off. Herein, as an example, as described above, the identification device 520 may operate by being powered by the moving object 510. Alternatively, the identification device 520 may be an apparatus that is powered by itself and operates, which is the same as described above. That is, the identification device 520 may be a device capable of operating irrespective of whether the moving object 510 is turned on or not, which is not limited to the above-described embodiment.

Based on what is described above, a turn-on condition of the moving object 510 may be a condition for recognizing the identification device 520. On the other hand, a turn-on condition of the moving object 510 may not be a necessary condition for recognizing the identification device 520. Hereinafter, commonly applied things will be described.

Herein, the network 530 may transmit authentication information to the identification device 520 based on the received user information. Herein, as an example, the authentication information may be a secret key or authentication key that is generated based on the user information. Next, the identification device 520 may confirm the authentication information based on received authentication information and information stored in the identification device 520 and transmit a response to the network 530. The network 530 may complete authentication. Next, the moving object 510 may receive various services provided by the network 530 through the identification device 520. Herein, the moving object 510 may be controlled based on an identified user. Based on the above-described process, a service for the moving object, to which the identification device 520 is attached, may be provided.

As an example, the above-described identification device 520 may store information on each user. Specifically, services for a moving object may be varied. As an example, a vehicle as a moving object is being used for driving but may not distinguish each user. However, more and more services are provided from a moving object to a user, and settings or information considering individual personality or personal characteristics may be required. In consideration of what is described above, the identification device 520 may store information or settings for a specific user and apply the information or settings to each moving object. As an example, the identification device 520 may include information on a user. As an example, user information may include at least any one or more among phone book information, application information, navigation information, charging information, and moving object setting information. As an example, when the moving object 510 is controlled through the identification device 520, the moving object 510 may perform communication with an external device via the network 530 based on the identification device 520. As an example, like a smart device (e.g., smart phone), the moving object 510 may exchange data information and voice signals with an external device. That is, the moving object 510 may execute a same function as an existing smart device. Herein, as an example, for what is described above, the identification device 520 may store information on a user. As an example, as described above, phone book information may be stored. Herein, the moving object 510 may perform communication with an external device through information included in the identification device 520. As another example, in consideration of the above-described operation, charging information may be stored in the identification device 520. As an example, the identification device 520 may include charging information based on data information that is transmitted and received via the network 530. Herein, the network 530 or a server may provide a service for data usage or voice signals to the identification device 520 based on the above-described charging information, which is not limited to the above-described embodiment. That is, a service and data, which are provided and used while a moving object is being used, may be managed based on the identification device 520. As another example, moving object information and moving object-related information may be further included in the identification device 520. As an example, in the case of a user using the moving object 510, the moving object 510 may be used with different settings for the moving object 510 according to each user. As an example, moving object setting information may be autonomous driving level information, vehicle seats, dashboard mode settings, channels, navigation settings, personal device settings, mirror settings, and the like. In addition, as an example, moving object setting information may be information on a driving characteristic set in a user's personal device for various driving environments, such as a position and height of a driver's seat, a color and brightness of an interior light, a position and angle of a room mirror and a side-view mirror, a temperature control (air conditioner and heater) range inside a vehicle, an angle of a steering wheel, a tire pressure, a transmission setting mode (normal, eco, power mode, etc.), a wireless communication connection mode (WAVE, cellular, etc.), an autonomous driving function setting variable range (speed and interval, lane change lateral speed, acceleration and deceleration, etc.), and the like. In addition, moving object setting information may include other various information apart from the above-described information, which is not limited to the above-described embodiment. That is, a customized service may be provided to a user using the moving object 510, and user setting information may be included in the identification device 520 in order to control the moving object 510 by considering the user. That is, a service provided through the moving object 510 may be performed based on the identification device 520.

As another example, the identification device 520 performs authentication via the network 530 but may be set not to perform communication with an external communication network. As an example, the moving object 510 may be identified and authenticated based on the identification device 520, as described above, but may restrict communication with an external communication network in consideration of security and risk of an accident. Herein, the identification device 520 may enable communication with another device existing inside the moving object in a local area network. That is, although the moving object 510 is controlled by the identification device 520, in consideration of the fact that the moving object 510 is a moving object, the identification device 520 may enable communication and data exchange with specific devices within a specific range, and based on this, may enable a service to be provided.

In addition, as an example, a multiplicity of users may be registered in one identification device. Herein, as an example, when operating based on what is described above, a service and data use may be set for each of the multiplicity of users. Herein, as an example, charging information may also be set and managed for each of the multiplicity of users.

On the other hand, as another example, each service and data use may be individually permitted for a multiplicity of users in one identification device. However, charging information for a service and data use or data use information may be managed all in one. That is, when considering service provision, a service may be provided to each of a multiplicity of users registered to one identification device. However, the management of the service may be performed as the identification device itself, which is not limited to the above-described embodiment.

As another example, when a multiplicity of users are registered in one identification device, common information of a moving object and user-specific information may be distinguished to be managed. As an example, when a multiplicity of users are registered in one identification device, common information may also be necessary to consider the identification of a moving object. Herein, with respect to the common information, it may not be necessary to distinguish each user, which may be managed by the identification device itself. As an example, vehicle state information may not be different according to each user but may be common information. On the other hand, navigation settings, vehicle seat settings and the like may be different according to each user and thus may be user-specific information. Herein, as an example, the identification device may distinguish and use common information and user-specific information respectively based on what is described above, but the present invention is not limited to the above-described embodiment.

Meanwhile, in consideration of the above description, a multiplicity of identification devices may be installed in a moving object. As an example, the multiplicity of identification devices described above may be identification devices for a same user. That is, the same user may control the moving object based on the multiplicity of identification devices. Herein, as an example, a specific device among the multiplicity of identification devices may manage a service and data provided via a communication network connected to an external device after recognizing a moving object as described above. On the other hand, a specific device among the multiplicity of identification devices may manage a service and data based on a local area network as a specific device inside a moving object, after recognizing a moving object as described above. As an example, when data exchange is needed to speak with another user or to provide various services through a moving object, a service may be provided to the moving object by means of an identification device capable of being connected to an external network. On the other hand, as for autonomous driving mode or vehicle security-related matters, a specific identification device may control a service and data, which are recognized only inside a moving object, in order to prevent external exposure. As an example, external access may be prevented for information obtained or used while a user is using a moving object such as autonomous driving information or a user's driving pattern analysis information. In consideration of the above description, there may be a multiplicity of identification devices in a moving object, based on which each may operate.

In addition, as a concrete example, various services may be provided through an identification device of a moving object. As an example, an operation record of a moving object may be stored through an identification device of the moving object. In addition, an operation record of a moving object may be confirmed according to each person and may be utilized through a server or a system.

Specifically, existing operation information of a moving object and relevant information may be stored and shared based on the moving object. Herein, when an identification device is applied to the moving object, a user may be identified through the identification device, and moving object operation information and relevant information may be stored and utilized according to each user. As an example, moving object operation information may include at least any one or more among destination information, travel distance information, driving pattern information, and driving route information. In addition, moving object operation information may be information that may be used based on a user of an identification device in relation to a moving object, which is not limited to the above-described embodiment. Herein, as the user may store and utilize moving object operation information related to him based on the identification device, the information may be utilized even when a different moving object is used. As an example, based on information stored in an identification device, a user may receive a service through autonomous driving or ITS infrastructure. As an example, an autonomous driving level, information on nearby restaurants, information on travel routes and other services related to the user's driving pattern may be provided. Herein, as described above, corresponding information may be managed through an identification device.

Figure 6:
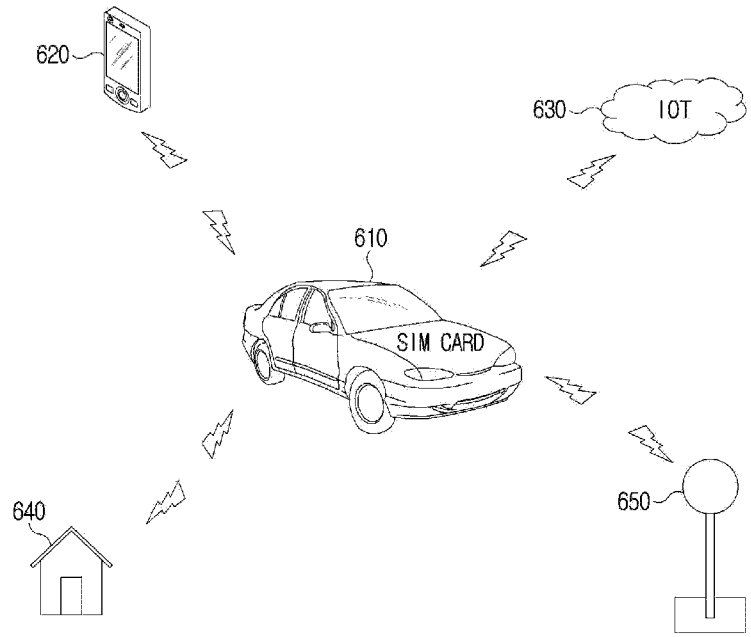
FIG. 6 is a view illustrating a method in which a moving object provides a service by performing communication with other apparatuses based on an identification device.

In addition, as an example, referring to FIG. 6, a moving object 610 may perform communication with another device via an identification device. As an example, the other device may be a smart device 620, an IoT-based peripheral apparatus 630, a home appliance capable of communication 640, or other apparatuses like RSU or ITS infrastructure 650. Herein, as the moving object 610 may be used by being identified and authenticated through an identification device, the moving object 610 may perform communication with the above-described apparatuses capable of communication via the identification device. As another example, an identification device (e.g., USIM) of a smart device may be a device compatible with an identification device of a moving object. In addition, like in a moving object, each identification device may be installed in another device, based on which communication may be performed and a service may be provided. As another example, one user may have an identification device for each device. That is, each identification device may be installed in each device, and each identification device may indicate the same user information. That is, a same user may use identification devices based on a same user ID of various devices. Herein, as an example, based on the same user information, a moving object and another device may be used by being connected to each other. Herein, as a multiplicity of devices are controlled based on the same user ID and the same user, security may be improved. In addition, after storing necessary information for the user, each device may transmit the information to another device. As an example, each device may periodically update the user's use history information for a corresponding device based on machine learning. Next, the updated use history information may be exchanged with another device, and the other device may be controlled by reflecting the information. That is, the user may control various devices through a multiple number of identification devices based on a same ID. Herein, charging information may also be provided based on one user ID, and thus the user's convenience may be improved.

Figure 7:
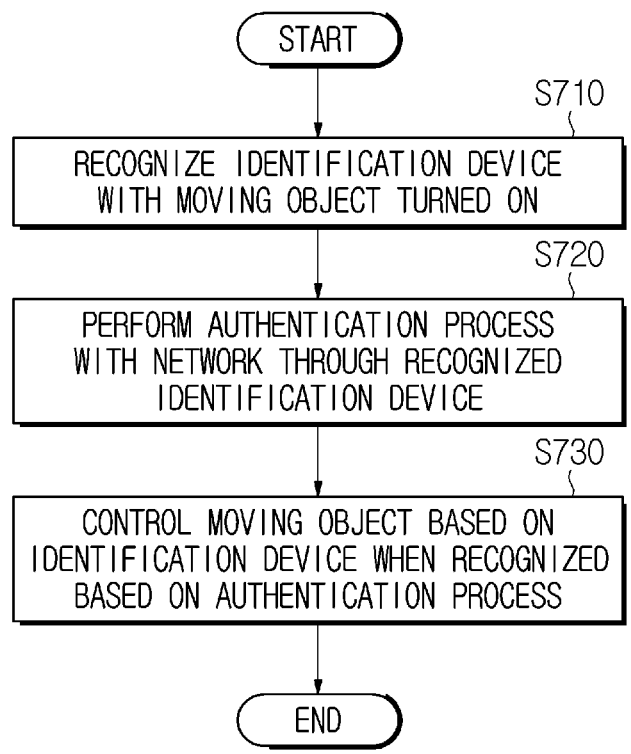
FIG. 7 is a flowchart for an operation method of a moving object.

FIGS. 5A and 5B are views illustrating a method in which a moving object operates based on an identification device. Referring to FIG. 7, when a moving object is turned on, an identification device may be recognized (S710). As an example, when the moving object is a vehicle and starts up, the moving object may identify the identification device through a contact unit and perform recognition of the identification device. Herein, when the moving object completely recognizes the identification device, an authentication process with a network may be performed through the recognized identification device (S720). Next, when the identification device and the network are authenticated based on the authentication process, the moving object may be controlled based on the identification device (S730). As an example, the identification device may include moving object setting information and user information based on a user ID. As an example, a moving object setting may be changed based on the moving object setting information. In addition, based on the user information, information on an operation of the moving object may be processed, which is not limited to the above-described embodiment.

Figure 8:
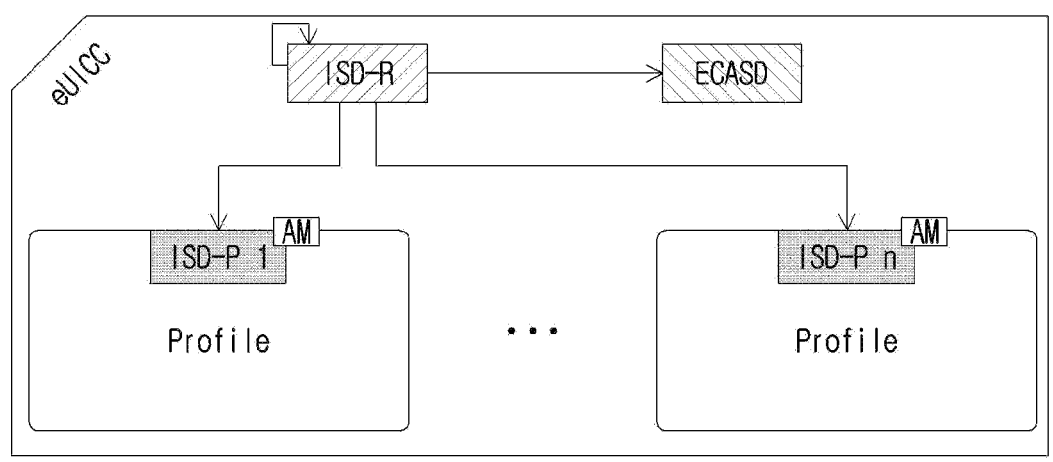
FIG. 8 is a view illustrating an embedded identification device.

FIG. 8 is a view illustrating a method in which a moving object operates based on an identification device. As an example, as described above, an embedded identification device or an identification device may store profile information as in FIG. 8. Herein, as an example, the profile information may be user-related information or information that is stored to use a moving object. Herein, as an example, considering the security of the moving object and the security of the identification device, a configuration capable of accessing the profile and a configuration for performing authentication with the moving object may be distinguished. That is, in an embedded identification device, a configuration capable of accessing the profile may obtain information on the control of the moving object from the profile and may transmit the information to a configuration capable of authentication with the moving object. In addition, as an example, the operation may be based on a different configuration from the configuration illustrated in FIG. 8, and the present invention is not limited to the above-described embodiment.

Figure 9:
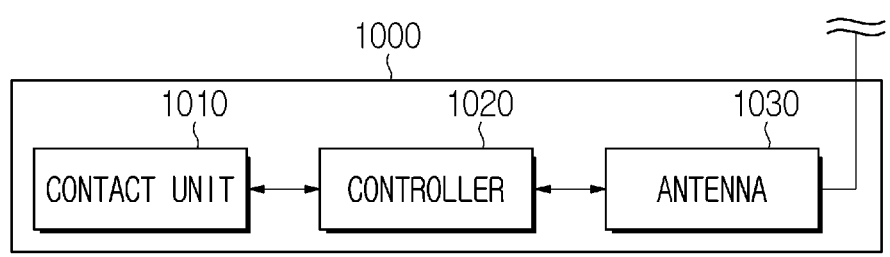
FIG. 9 is a view illustrating an apparatus configuration for an identification device.

FIG. 9 is a view illustrating an identification device. Referring to FIG. 9, an identification device 1000 may include a contact unit 1010 contacting a moving object or another device and enabling the moving object or other device to be recognized. In addition, as an example, the identification device 1000 may include a controller 1020 controlling and managing an operation based on the identification device 1000. In addition, the identification device 1000 may include an antenna 1030 that performs communication with another device and exchanges data. Herein, as an example, the controller 1020 may manage the contact unit 1010 and the antenna 1030 and may control other configurations. In addition, the configurations may be hardware configurations or software configurations. That is, the configurations may refer to configurations actually and physically included in the identification device 1000 or software configurations operating based on the operation and function of the identification device 1000. However, the present invention is not limited to the above-described embodiment.

Figure 10:
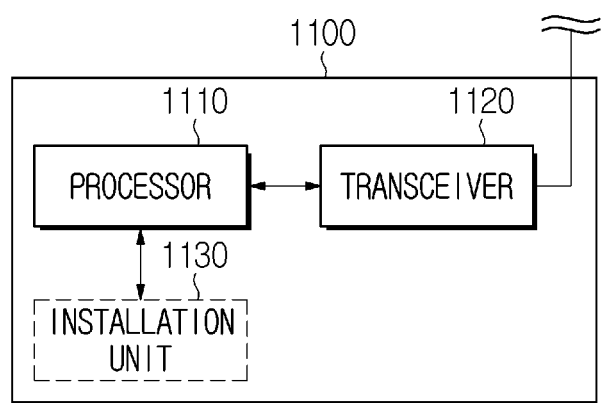
FIG. 10 is a view illustrating an apparatus configuration.

FIG. 10 is a view illustrating an apparatus configuration. Referring to FIG. 10, an apparatus may include at least one among the above-described moving object, a device, a server and an RSU. In other words, the apparatus may communicate and work with another device, which is not limited to the above-described embodiment. As an example, for the above-described operation, an apparatus 1100 may include a processor 1110 and a transceiver 1120. That is, the apparatus may include a necessary configuration for communicating with another apparatus. In addition, as an example, the apparatus may include other configurations than the above-described configuration. That is, the apparatus may have a configuration, which includes the above-described apparatus for communicating with another device but is not limited thereto, and may be an apparatus operating based on what is described above.

In addition, as an example, the apparatus 1101 may further include an installation unit 1130 in which another device (e.g., identification device) is installed. Herein, the installation unit may be included in a moving object in the above-described forms of FIG. 2A to FIG. 2D. As an example, the installation unit 1130 may be embodied in any one region in front of a driver's seat in a moving object. In addition, as an example, the installation unit 1130 may be embodied in a passenger seat kit in a moving object. In addition, as an example, the installation unit 1130 may be embodied in a mirror in a moving object. In addition, as an example, the installation unit 1130 may be embodied in a form of cradle or paddle in a moving object, which is the same as described above. That is, as described above, the apparatus 1101 may further include the installation unit 1130 for recognizing an identification device as another device, based on which another device may be recognized and authentication may be performed. Herein, as an example, the installation unit 1130 may be a configuration in which the above-described apparatus of FIG. 9 is installed. As another example, the installation unit 1130 may be embodied inside a moving object, as illustrated in FIG. 4. Herein, the installation unit 1130 may be embodied as a physical configuration inside the apparatus 1101. As another example, the installation unit 1130 may be embodied as a software configuration inside the apparatus 1100. Herein, when the installation unit 1130 is embodied inside the apparatus 1100, an identification device may also be embodied either as a physical configuration or a software configuration inside the apparatus, as described above. The present invention is not limited to the above-described embodiment.

Although the exemplary methods of the present disclosure described above are represented by a series of acts for clarity of explanation, they are not intended to limit the order in which the steps are performed, and if necessary, each step may be performed simultaneously or in a different order. In order to implement a method according to the present disclosure, the illustrative steps may include an additional step or exclude some steps while including the remaining steps. Alternatively, some steps may be excluded while additional steps are included.

The various embodiments of the disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

What is claimed is:

1. A method for operating a moving object to which an identification device is applied, the method comprising:
   recognizing the identification device in response to the moving object being turned on;
   performing an authentication process with a network through the recognized identification device; and
   controlling the moving object based on the identification device in response to authentication being completed based on the authentication process;
   wherein the moving object performs an additional authentication process for the identification device when the moving object first recognizes the identification device;
   wherein the moving object stores history information for the identification device in response to the additional authentication process for the identification device being completed;
   wherein the moving object recognizes the identification device corresponding to the history information; and
   wherein the moving object performs the authentication process via the network without the additional authentication process.

2. The method of claim 1, further comprising detecting a user of the moving object in response to the authentication being completed, wherein controlling the moving object is performed in response to the detected user of the moving object corresponding to a user ID that is authenticated based on the identification device.

3. The method of claim 2, wherein the user is detected based on an authentication key, image recognition, fingerprint recognition, iris recognition, face recognition, or voice recognition.

4. The method of claim 2, wherein the moving object is controlled irrespective of authentication of the identification device in response to the moving object sensing an emergency situation.

5. The method of claim 1, wherein the identification device comprises moving object setting information corresponding to a user ID, and wherein the method further comprises changing a setting for the moving object based on the moving object setting information in response to the authentication being completed based on the identification device.

6. The method of claim 5, wherein the moving object setting information comprises a position of a driver's seat, a height of the driver's seat, a color of interior lighting, brightness of the interior lighting, a position of a room mirror, an angle of the room mirror, a position of a side-view mirror, an angle of the side-view mirror, an inside temperature, a steering wheel angle, a tire pressure, an autonomous driving setting parameter, a transmission setting mode, a dashboard mode, a navigation setting, a content setting, or a wireless communication linkage mode.

7. The method of claim 1, wherein recognizing the identification device is performed while the identification device is installed.

8. The method of claim 1, wherein, when the moving object first recognizes the identification device, the moving object verifies an ID or authority information of the identification device and performs the additional authentication process based on the verified ID or authority information.

9. The method of claim 8, wherein, when the moving object first recognizes the identification device, the moving object further exchanges authentication information on the identification device with another device, which has been completely authenticated, and performs the additional authentication process based on the exchanged authentication information.

10. The method of claim 1, wherein the identification device is installed in a mirror of the moving object.

11. The method of claim 1, wherein the identification device performs the authentication process by being recognized irrespective of whether or not the moving object is turned on.

12. The method of claim 11, wherein the identification device operates by receiving power from the moving object when the identification device performs the authentication process by being recognized while the moving object is turned off.

13. The method of claim 11, wherein the identification device operates by being powered by itself when the identification device performs the authentication process by being recognized while the moving object is turned off.

14. A moving object to which an identification device is applied, the moving object comprising:
   a transceiver configured to transmit and receive a signal; and
   a processor configured to:
      control the transceiver;
      recognize an identification device, when the moving object is turned on; and
      perform an authentication process with a network through the recognized identification device, and
   wherein the moving object is configured to be controlled based on the identification device in response to authentication being completed based on the authentication process;
   wherein the moving object is configured to perform an additional authentication process for the identification device when the moving object first recognizes the identification device;
   wherein the moving object is configured to store history information for the identification device in response to the additional authentication process for the identification device being completed;
   wherein the moving object is configured to recognize the identification device corresponding to the history information; and
   wherein the moving object is configured to perform the authentication process via the network without the additional authentication process.

15. The moving object of claim 14, wherein:
   the processor is configured to detect a user of the moving object after the authentication is completed; and
   the moving object is configured to be controlled in response to the detected user of the moving object corresponding to a user ID that is authenticated based on the identification device.

16. The moving object of claim 14, wherein:
   the identification device comprises moving object setting information corresponding to a user ID; and
   a setting for the moving object is configured to be changed based on the moving object setting information in response to the authentication being completed based on the identification device.

17. A system comprising:
   a moving object including a transceiver and a processor coupled to the transceiver; and
   an identification device;
   wherein the processor is configured to:
      recognize the identification device when the moving object is turned on;

perform an authentication process with a network;

control the moving object based on the identification device when authentication is completed based on the authentication process;

perform an additional authentication process for the identification device when the moving object first recognizes the identification device;

store history information for the identification device in response to the additional authentication process for the identification device being completed;

recognize the identification device corresponding to the history information; and perform the authentication process via the network without the additional authentication process.

18. The system of claim 17, wherein the identification device is installed in a mirror of the moving object.

19. The moving object of claim 15, wherein the processor is configured to detect the user based on an authentication key, image recognition, fingerprint recognition, iris recognition, face recognition, or voice recognition.

20. The moving object of claim 14, wherein the identification device is installed in a mirror of the moving object.

* * * * *